Aug. 18, 1964     N. CALLA     3,145,020
SPRING ASSISTED FOAM CUSHION CONSTRUCTION
Filed Aug. 26, 1963
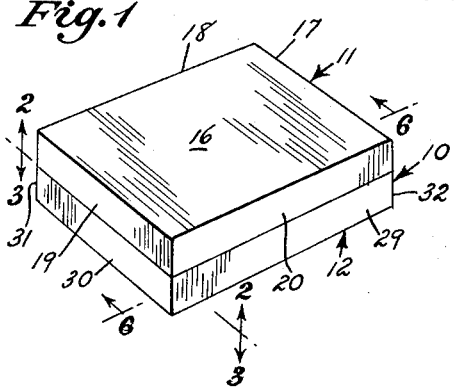
Fig.1
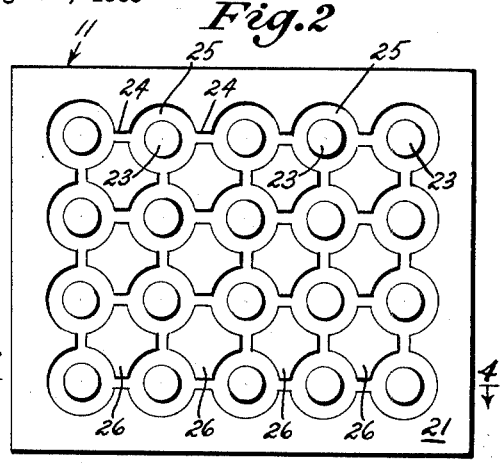
Fig.2
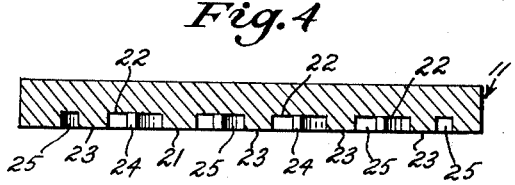
Fig.4
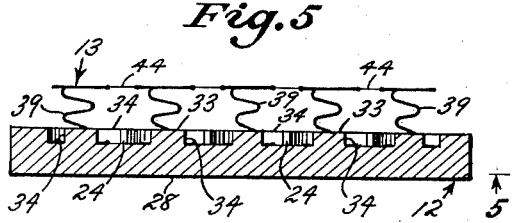
Fig.5
Fig.3
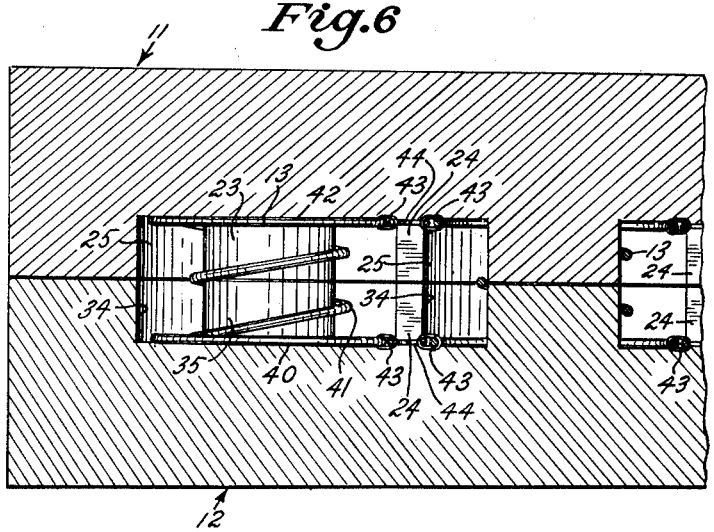
Fig.6
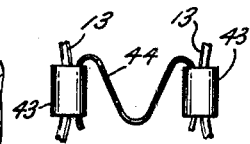
Fig.7
Fig.8

United States Patent Office 3,145,020
Patented Aug. 18, 1964

3,145,020
SPRING ASSISTED FOAM CUSHION
CONSTRUCTION
Nick Calla, 1466 W. 5th St., Brooklyn, N.Y.
Filed Aug. 26, 1963, Ser. No. 304,369
3 Claims. (Cl. 267—1)

This invention relates generally to the field of foam cushions, and more particularly to an improved spring assisted type in which the spring elements are of a coil type and positioned completely within the foam elements comprising the cushion. Devices of this type are generally known in the art, and the invention lies in specific constructional details permitting an improved resilient action, coupled with ease of manufacture and assembly.

It is among the principal objects of the present invention to provide an improved spring assisted foam construction in which the assembly of the foam elements of the cushion serve to prestress the resilient spring elements wherein a stiffer spring construction is obtained while yet occupying a minimum of depth as measured from top to bottom of the assembled cushion.

Another object of the invention lies in the provision of an improved spring assisted foam cushion construction, possessed of the above advantages, in which the cost of fabrication may be of a reasonably low order, with consequent wide sale, distribution and use.

Still another object of the invention lies in the provision of an improved spring assisted foam cushion construction of the class described in which heavy loads carried by a relatively small portion of the total area of the cushion are distributed throughout all of the resilient components of the same.

A feature of the invention lies in the fact that the same may be manufactured using existing manufacturing techniques well known in the art.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a view in perspective of an embodiment of the invention.

FIGURE 2 is a bottom plan view of one of the foam elements comprising a part of the embodiment, as seen from the plane 2—2 in FIGURE 1.

FIGURE 3 is a top plan view of a second of the foam elements comprising a part of the embodiment in engaged condition with respect to a coil spring element, as seen from plane 3—3 in FIGURE 1.

FIGURE 4 is a transverse sectional view as seen from the plane 4—4 in FIGURE 2.

FIGURE 5 is a transverse sectional view as seen from the plane 5—5 in FIGURE 3.

FIGURE 6 is a transverse sectional view as seen from the plane 6—6 in FIGURE 1.

FIGURE 7 is a fragmentary view in elevation showing the interconnection of certain of the coil spring units forming a part of the invention.

FIGURE 8 is a sectional view as seen from the plane 8—8 in FIGURE 7.

In accordance with the invention, the device, generally indicated by reference character 10, comprises broadly: a first or upper foam element 11, a second or lower foam element 12, and an interconnected spring element 13.

The upper foam element 11 may be formed of any suitable foam material, such as sponge rubber or polyurethane and, as best seen in FIGURE 1 in the drawings, is of generally rectangular configuration. The element 11 is bounded by an upper surface 16, side surfaces 17, 18, 19 and 20 and a lower surface 21. Extending inwardly from the lower surface 21 into the body of the element 11 are a plurality of annular recesses 22 each forming a central protuberance 23, and communicating with adjacent recesses through interconnecting channels 24. The bottom surfaces 25 of the recess of 22 and channels 24 are preferably in coplanar relation as best seen in FIGURE 4.

The second or lower foam element 12 is substantially similar and symmetrical being bounded by a lower surface 28, side surfaces 29, 30, 31 and 32, and an upper surface 33. Extending inwardly into the body of the second foam element 12 from the upper surface 33 are a similar plurality of annular recesses 34 forming central protuberances 35, the recesses 34 being interconnected in a similar manner by channels 24. Disposed between the recesses 34 and channels 24 are a plurality of disconnected areas 37 of the upper surface 33 which correspond in number and configuration to similar disconnected areas 26 on the lower surface 21 of the first foam element 11.

The spring element 13 includes a plurality of wire coil sections 39, each having a lowermost convolution or ring 40, a spiral compressible section 41 and an upper convolution or ring 42. Each of the coil sections 39 is connected to adjacent similar sections by means of metal clips 43 and a suitable resilient interconnecting member 44 (see FIGURES 7 and 8). By making the resilient interconnecting members 44 of a relatively high modulus, as contrasted with that of the coil sections 33, the relatively concentrated heavy loads are distributed throughout the entire spring element 13, to prevent undesired sagging in the center of the cushion as is common in coil springs constructions.

During assembly of the device 10, the lower surface 21 of the element 11 and the upper surface 33 of the element 12 are coated with a suitable high strength adhesive, such as epoxy resin and the like, following which the pring element 13 is positioned in the recesses and channels of the lower form element 12. Next the upper foam element 11 is positioned as shown in FIGURES 1 and 6, wherein the coil sections 39 of the spring element 13 are partially compressed a substantial distance, to approximately one-half to two-thirds of their original unstressed height, and the elements 11 and 12 are maintained in such condition until the adhesive, generally indicated by reference character 47 has completely cured.

On the completion of this condition, the device 10 is ready for use, wherein it will be observed that the same will exhibit a differential resiliency between the foam elements 11 and 12 and the spring element 13. Thus, when a relatively light load is placed upon the cushion, the relatively low modulus of the foam elements 11 and 12 will support the load without further compression of the spring element 13. With the occurrence of heavier loads, the foam elements will distort to a point where the spring element 13 comes into play and adds additional support. As the individual coil sections 39 are plied together by the members 44, although the coil sections are under substantial compression element at all times, they cannot break through the foam elements at any one point, thus adding substantially to the useful life of the entire device.

It will be observed that owing to the integration of the spring element 13 prior to assembly of the entire device, the assembly procedure is materially simplified as contrasted with the positioning of individual coils which are unrelated to each other, the common practice in the prior art. By cutting channels in both the upper and lower foam elements which interconnect the annular recesses, accommodation is made for the free flexing of the members 44 as required, the channels also facilitating the positioning of the spring element within the elements 11 and 12.

I wish it to be understood that I do not consider the invention limited to the precise details of structure shown and set forth in this specification, for obvious modifications will occur to those skilled in the art to which the invention pertains.

I claim:

1. In a spring assisted foam cushion construction, a first foam element having upper and lower surfaces, there being a first plurality of annular recesses extending from said lower surface into the body of said first foam element to form a plurality of substantially cylindrical protuberances; means interconnecting said annular recesses; a corresponding second foam element having upper and lower surfaces, there being a second plurality of recesses extending from said upper surface of said second foam element corresponding in location to said first plurality of annular recesses, to form a second plurality of cylindrical protuberances and a plurality of detached areas on said last mentioned upper surface, and a spring element including a plurality of coils corresponding to the number of annular recesses in each of said first and second foam elements, said coils each being disposed partially within an individual annular recess in each of said first and second foam elements, said coils having a relatively unstressed length greater than the combined depth of the recesses in which it is disposed, said first and second foam elements being cemented together over the lower surface of said first foam element and the upper surface of said second foam element to prestress said coils.

2. In a spring assisted foam cushion construction, a first foam element having upper and lower surfaces, there being a first plurality of of annular recesses extending from said lower surface into the body of said first foam element to form a plurality of substantially cylindrical protuberances; means interconnecting said annular recesses; a corresponding second foam element having upper and lower surfaces, there being a second plurality of annular recesses extending from said upper surface of said second foam element corresponding in location to said first plurality of annular recesses, to form a second plurality of cylindrical protuberances and a plurality of detached areas on said last mentioned upper surface, and a spring element including a plurality of coils corresponding to the number of annular recesses in each of said first and second foam elements, said coils each being disposed partially within an individual annular recess in each of said first and second foam elements, said coils having a relatively unstressed length greater than the combined depth of the recesses in which it is disposed, said first and second foam elements being cemented together over the lower surface of said first foam element and the upper surface of said second foam element to prestress said coils, and means mutually interconnecting said coils at the upper and lower ends thereof.

3. In a spring assisted foam cushion construction, a first foam element having upper and lower surfaces, there being a first plurality of annular recesses extending from said lower surface into the body of said first foam element to form a plurality of substantially cylindrical protuberances; means interconnecting said annular recesses; a corresponding second foam element having upper and lower surfaces, there being a second plurality of annular recesses extending from said upper surface of said second foam element corresponding in location to said first plurality of annular recesses, to form a second plurality of cylindrical protuberances and a plurality of detached areas on said last mentioned upper surface, and a spring element including a plurality of coils corresponding to the number of annular recesses in each of said first and second foam elements, said coils each being disposed partially within an individual annular recess in each of said first and second foam elements, said coils having a relatively unstressed length greater than the combined depth of the recesses in which it is disposed, said first and second foam elements being cemented together over the lower surface of said first foam element and the upper surface of said second foam element to prestress said coils, and means resiliently and mutually interconnecting said coils at the upper and lower ends thereof.

References Cited in the file of this patent

UNITED STATES PATENTS

| 2,398,237 | Marsck | Apr. 9, 1946 |
| 2,675,752 | Berman | Apr. 13, 1954 |

FOREIGN PATENTS

| 407,207 | Great Britain | Mar. 15, 1934 |